United States Patent [19]
Krull

[11] 3,875,037
[45] Apr. 1, 1975

[54] ELECTRODE STRUCTURE
[75] Inventor: Irwin H. Krull, Santa Ana, Calif.
[73] Assignee: Beckman Instruments, Inc., Fullerton, Calif.
[22] Filed: Feb. 19, 1974
[21] Appl. No.: 443,485

[52] U.S. Cl. ............................................ 204/195 P
[51] Int. Cl. ........................................... G01n 27/46
[58] Field of Search ............ 204/195 P, 195 M, 1 T; 324/29

[56] References Cited
UNITED STATES PATENTS

| | | | |
|---|---|---|---|
| 3,325,378 | 6/1967 | Greene et al. | 204/1 T |
| 3,351,544 | 11/1967 | Medlar | 204/195 P |
| 3,575,836 | 4/1971 | Sternberg | 204/195 P |
| 3,718,562 | 2/1973 | Haddad | 204/195 P |
| 3,718,563 | 2/1973 | Krull et al. | 204/195 P |

*Primary Examiner*—G. L. Kaplan
*Attorney, Agent, or Firm*—R. J. Steinmeyer; J. G. Mesaros

[57] ABSTRACT

An electrode structure having a generally tubular body terminating in a generally cup-shaped end with an axially extending aperture. An insert is provided, the insert having a circumferential shoulder for engaging a circumferential detent within the open end of the body, the engagement being accomplished by providing a plurality of axially extending slots about the periphery of the open end, the fingers so formed deforming under pressure of insertion of the insert until the shoulder engages the detent means. A cap is provided to cover the open end of the tubular body in closing mating relationship to maintain the engagement of the shoulder within the detent. The aperture is closed by means of a membrane in sealing relation with an electrode extending through the insert.

8 Claims, 4 Drawing Figures

ELECTRODE STRUCTURE

BACKGROUND OF THE INVENTION

This invention relates to an electrode structure and more particularly an electrode structure simple in configuration and ease of assembly.

In polarographic electrodes employing an electrolyte solution, a polarographic electrode and a reference electrode in contact with the electrolyte solution, simplicity and ease of construction are desirable parameters. Prior art electrode structures have tended to be unduly complicated, require many parts and oftentimes necessitated special machining.

Accordingly, it is an object of this invention to provide a new and improved electrode structure.

It is another object of this invention to provide an electrode structure providing ease of manufacture and simplicity in assembly.

SUMMARY OF THE INVENTION

The foregoing and other objects of the invention are accomplished by providing an electrode structure having a tubular body member terminating at one end in a generally cup-shaped end with an axially extending aperture therethrough, the inner surface of the other end having a circumferential detent formed therein with the other end being axially slotted to form a plurality of flexible or resilient fingers. An insert member having the electrode imbedded therein is provided with the upper portion of the insert member having a circumferential shoulder for frictionally engaging the detent, the lower portion of the insert having a reduced diameter for forming a reservoir between the outer surface thereof and the inner adjacent surface of the cup-shaped end of the body. The electrode surface is coextensive with the end surface of the insert in proximity to the aperture with a membrane surrounding the electrode with sealing means provided within the membrane and the inner surface of the cup-shaped end adjacent the aperture. A cover is provided for close mating relation with the other end of the body to both close the other end of the body and fixedly maintain the shoulder within the detent.

The novel features which are believed to be characteristic of the invention are set forth with particularity in the specification which can best be understood by reference to the following description taken in conjunction with the accompanying drawings.

DESCRIPTION OF THE PREFERRED EMBODIMENT

Figure 1:
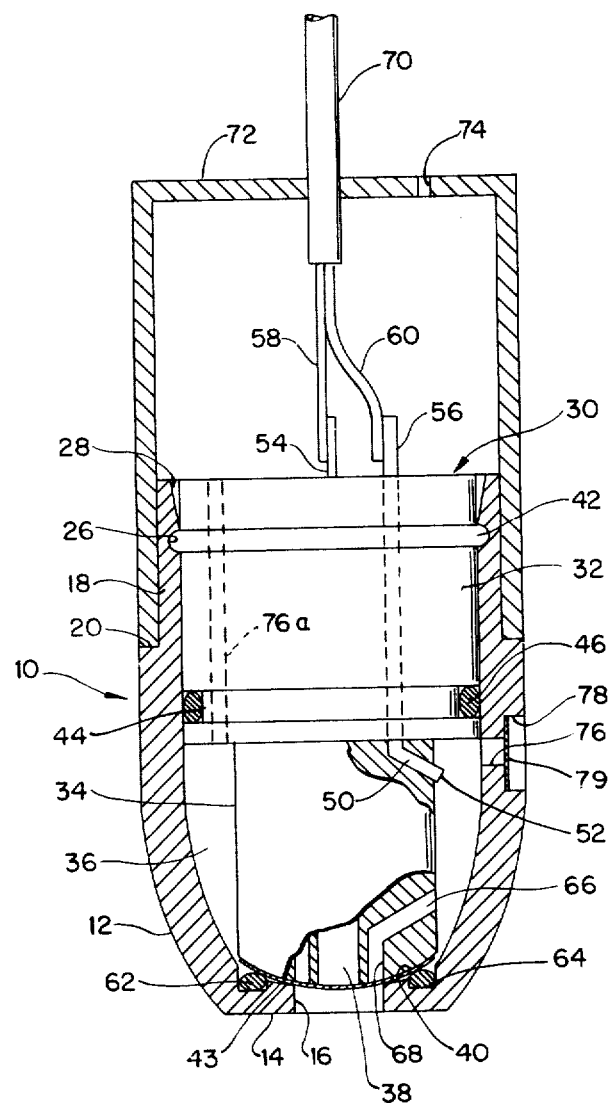
FIG. 1 is a front plan view partially cross sectioned showing an electrode structure according to the invention.

Referring now to the drawings and particularly to FIG. 1, there is shown an electrode structure having a main body 10 which is generally tubular terminating at the lower end thereof in a generally cup-shaped portion 12 having the bottom 14 with an aperture 16 formed therein, the aperture 16 being circular and coaxial with the axis of the tubular body 10. The other end 18 of body 10 has a reduced outside diameter to form a circumferential lip 20.

Figure 3:
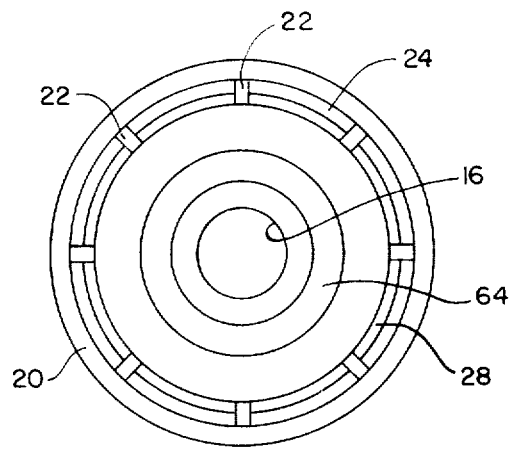
FIG. 3 is a top plan view of the body of FIG. 2.
Figure 2:
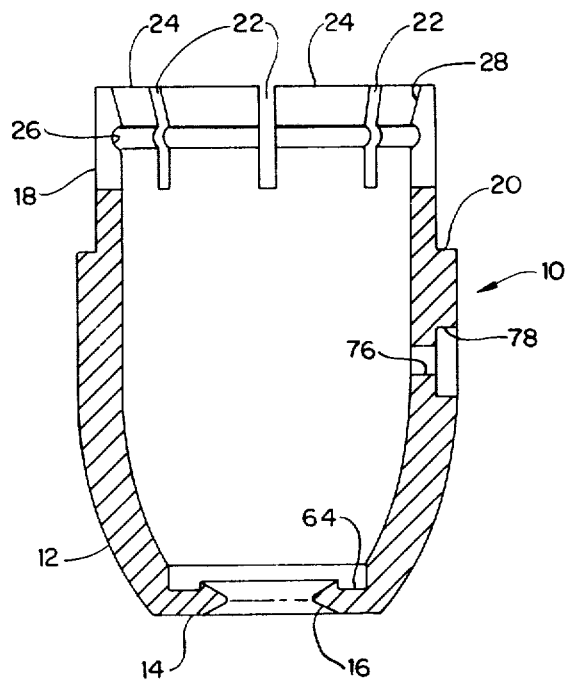
FIG. 2 is a cross-sectional front plan view of the tubular body used in the electrode structure of FIG. 1.

The other end 18 of body 10, as shown in FIGS. 2 and 3, has a plurality of radially extending slots 22 cut therethrough with the slots extending in an axial direction short of the lip 20 to form a plurality of upwardly extending flexible fingers 24. Configured within the inner surface of the other end 18 is a circumferential furrow or detent means 26 with the inner surface immediately above the furrow 26 being outwardly tapered at 28.

Figure 4:
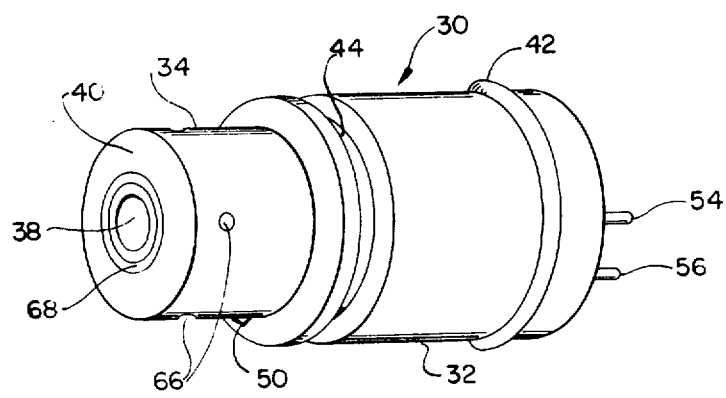
FIG. 4 is an isometric view of the insert member used in the electrode structure of FIG. 1.

As shown in FIGS. 1 and 4, an insert member 30 is inserted within the body 10, the body 10 being a molded or cast part of insulating material such as plastic, with the insert 30 likewise being a molded or cast part of insulating material. The insert 30 has an upper portion 32 having a diameter slightly less than the inner diameter of the tubular body 10 and a lower portion 34 having a reduced diameter sufficient to create an electrolyte reservoir 36 between the lower portion 34 and the inner surfaces of the cup-shaped end 12 of the tubular body 10. The insert member 30 has imbedded therein a suitable electrode 38 axially positioned within the insert member 30, with the electrode 38 having the lower end thereof coextensive with the arcuate surface 40 of the reduced diameter portion 34 of insert member 30.

The upper portion 32 of member 30 is provided with a shoulder means 42 circumferentially encompassing upper portion 32 adjacent the top surface thereof, shoulder means 42 being adapted for frictional engagement within the detent 26. Formed within the upper portion 32 adjacent the lower edge thereof is a groove 44 which receives sealing means such as an O-ring 46 to provide a liquid tight seal for the electrolyte reservoir 36.

Also formed within the insert member 30 is a second electrode or anode 50 which is generally disposed on a line offset from the axis of insert member 30 with the lower portion thereof being angularly disposed toward the outer surface of the lower portion 34 of insert member 30 to expose the lower tip 52 of the anode 50 to the electrolyte reservoir 36. Both electrode 38 and anode 50 terminate in electrical connections 54 and 56, respectively, extending through the upper surface of insert member 30 for attachment to electrical leads 58 and 60, respectively.

The arcuate surface 40 of the lower portion 34 of the insert member 30 terminates in proximity to the aperture 16 in the bottom 14 of cup-shaped end 12. A membrane 43 substantially covers the arcuate portion 40, the membrane 43 being retained in place by a suitable sealing means such as O-ring 62 positioned within annular groove 64 encircling aperture 16 on the inner surface of the bottom 14.

The electrode 38 and the anode 50 can be of any suitable composition for determination of molecular reactive species with the electrolyte solution within the electrolyte reservoir 36 being appropriate for the determination.

Electrolyte passages or channels 66 provide electrolyte flow from the reservoir 36 to an annular groove 68 displaced from but encircling the electrode 38.

During assembly of the electrode structure, O-ring 62 is positioned within the annular groove 64 in the bottom of tubular member 10. The insert member 30 has the membrane 42 affixed to the arcuate portion 40 of the lower portion 34 of insert member 32 and the O-ring 46 is fitted within the groove 44. The insert member 30 is then inserted into the body 10 with the shoulder 42, coacting with the tapered portions 28 of fingers 24 to outwardly deflect the fingers 24 until the shoulder 42 is frictionally engaged within detent 26. A cable 70 is inserted through a cover 72 and the leads 58 and 60 are suitably electrically connected to the terminating ends 54 and 56 of electrodes 38 and 50, respectively. The cover 72 is generally cup-shaped and is slid over the other end of body member 10 until the open end of cover 72 is resting on lip 20. The inner diameter of cover 72 at the section coacting with the end 18 of tubular body 10 is of approximately the same diameter as the outer diameter of other end 18 to thereby maintain the detent 26 in engagement with the shoulder 42. Cover 72 is secured to body 10 by suitable adhesive means. An aperture 74 is provided in the plane surface of cover 72 for insertion therethrough of suitable encapsulating material (not shown).

The electrolyte reservoir 36 is then filled with a suitable electrolyte solution by means of aperture 76 located in the side wall of tubular body 10 to communicate with the reservoir 36 adjacent the upper end thereof. A recess 78, coaxial with aperture 76, encircles aperture 76 to permit insertion into recess 78 of a suitable sealing membrane or diaphragm 79 to thereby seal the reservoir 36. The diaphragm 79 provides pressure compensation between the reservoir 36 and the outside environment. Alternatively, a passageway 76a can be provided in the insert itself for introducing the electrolyte and a diaphragm can be used to seal the passage. One use for this electrode structure can be, for example, an oxygen probe for determination of oxygen in lakes or rivers at various depths. In this event pressure compensation is necessary to maintain the membrane 43 in proper spatial relation to the cathode 38 and the annulus 68 for accurate results.

With the outer diameter of cover 72 coextensive with the outer diameter of the main portion of tubular body 10 it can be seen there is provided an electrode structure of simple design, few parts, with ease of construction and ease of assembly. While there has been shown and described a preferred embodiment, it is to be understood that various other adaptations and modifications may be made within the spirit and scope of the invention.

What is claimed is:

1. An electrode assembly comprising:
   a generally tubular body having a generally cup-shaped end with an axially extending aperture therethrough, said body having detent means on the inner surface thereof adjacent the other end, said other end being flexibly configured adjacent said detent means;
   an insert member having an upper portion configured for mating engagement within said body and a lower portion having an electrode therein for positioning in proximity to said aperture, said upper portion having shoulder means for frictionally engaging said detent means;
   membrane means in mating sealing relationship between said aperture and said electrode; and
   cover means configured for encircling said other end of said body and for fixedly maintaining said shoulder means in said detent means.

2. The combination according to claim 1 wherein said detent means is a peripheral recess formed on the inner surface of said other end of said body and said shoulder means is a peripheral shoulder formed in the upper portion of said insert member.

3. The combination according to claim 2 wherein said body, said insert member and said cover have circular cross sections.

4. The combination according to claim 3 wherein said other end has a plurality of axially extending slots formed therein to provide a plurality of flexible fingers and said cover coacts with the outer surface of said body to completely encircle said slots.

5. The combination according to claim 4 wherein said other end has a smaller outside diameter than the adjacent portion of said body and said cover is engageable with said other end so that the outer surface of said cover is coextensive with the outer surface of the adjacent portion of said body.

6. The combination according to claim 5 wherein said upper portion of said insert has a circumferential groove therein for receiving sealing means between said groove and the adjacent inner surface of said body.

7. The combination according to claim 6 wherein said membrane means includes a sealing member between the membrane and the inner surface of said cup-shaped end adjacent said aperture.

8. The combination according to claim 1 wherein said lower portion of said insert and the adjacent inner surface of said body form a reservoir adapted for receiving an electrolyte solution, and one of said insert member and said body has an aperture communicating with said reservoir for inserting the electrolyte solution, said aperture being sealed by a pressurecompensating diaphragm.

* * * * *